US012654352B2

(12) United States Patent
Katz-Moses et al.

(10) Patent No.: US 12,654,352 B2
(45) Date of Patent: Jun. 16, 2026

(54) JIG SQUARE FOR CROSSCUT SLED

(71) Applicant: Katz-Moses Group, LLC, Santa Barbara, CA (US)

(72) Inventors: Jonathan Katz-Moses, Riverdale, CA (US); Andrew Klein, Parker, CO (US)

(73) Assignee: Katz-Moses Group, LLC, Santa Barbara, CA (US)

( * ) Notice: Subject to any disclaimer, the term of this patent is extended or adjusted under 35 U.S.C. 154(b) by 265 days.

(21) Appl. No.: 18/424,384

(22) Filed: Jan. 26, 2024

(65) Prior Publication Data

US 2025/0242518 A1 Jul. 31, 2025

(51) Int. Cl.
*B27B 27/10* (2006.01)
*B27B 25/10* (2006.01)

(52) U.S. Cl.
CPC .............. *B27B 27/10* (2013.01); *B27B 25/10* (2013.01)

(58) Field of Classification Search
CPC ......... B27B 27/00; B27B 27/10; B27B 27/08; B27B 25/10; B25H 1/0078
See application file for complete search history.

(56) References Cited

U.S. PATENT DOCUMENTS 4,095,632 A 6/1978 Raulinaitis
4,256,000 A 3/1981 Seidel
4,608,898 A 9/1986 Volk
5,109,742 A 5/1992 Strong
5,379,669 A * 1/1995 Roedig .................. B23Q 3/007 83/435.14
5,743,161 A * 4/1998 Boudreau .............. B27B 5/265 83/435.11
5,768,966 A 6/1998 Duginske
6,725,754 B2 4/2004 MacKenzie
7,140,286 B2 11/2006 Schwartz
7,341,081 B1 3/2008 Villiger
7,347,233 B2 * 3/2008 Freidlund .............. B27B 25/10 144/144.1
7,360,567 B2 4/2008 Gregoire
7,409,973 B2 8/2008 Hyde
7,930,960 B2 4/2011 Duginske
9,545,734 B2 1/2017 Suhling
10,532,414 B2 1/2020 Smith
2005/0241450 A1 * 11/2005 Schwartz ................ B27B 29/00 83/448
2006/0157158 A1 7/2006 Freidlund
(Continued)

OTHER PUBLICATIONS

International Search Report and Written Opinion from co-pending application PCT/US2025/012689, Forms PCT/ISA/220, PCT/ISA/210, PCT/ISA/237 (May 23, 2025).

*Primary Examiner* — Bobby Yeonjin Kim
(74) *Attorney, Agent, or Firm* — Sierra IP Law, PC; Mark D. Miller

(57) ABSTRACT

Embodiments of the present invention provide methods and apparatus for squaring a fence or other surface in a woodworking jig relative to the saw blade of the table saw used with the jig, by providing an adjustable tool that may be engaged with a kerf created by the blade of the table saw. Embodiments of the invention may be used to create a crosscut sled without using the "five-cut method". In different embodiments, the invention may be used not only to square to the saw blade, but also to set other angles relative to the saw blade in the event that different positioning is desired.

19 Claims, 10 Drawing Sheets

(56) References Cited

U.S. PATENT DOCUMENTS

| | | | | |
|---|---|---|---|---|
| 2008/0121310 | A1 | 5/2008 | Grisley | |
| 2011/0226384 | A1 | 9/2011 | Kinsler | |
| 2012/0118120 | A1 | 5/2012 | Niichel | |
| 2012/0237310 | A1 | 9/2012 | van Valkenburg | |
| 2020/0376706 | A1* | 12/2020 | Dutterer | B27B 27/10 |
| 2024/0165721 | A1* | 5/2024 | Smith | B27B 25/10 |

* cited by examiner

SECTION A-A

JIG SQUARE FOR CROSSCUT SLED

BACKGROUND OF THE INVENTION

The present invention relates to woodworking tools, and more particularly to tools for use in making a crosscut sled or other woodworking jig that requires a back fence or other surface to be perpendicular to the blade of a table saw with which the crosscut sled or other jig will be used, and related methods of use.

FIELD OF THE INVENTION

Woodworking, a discipline requiring meticulous accuracy, especially demands this precision in angular cuts. In the domain of cabinetry, fine furniture crafting, and precision framing, the accuracy of right-angle cuts is paramount. A common jig used in woodworking is a crosscut sled, which follows the miter slots of a table saw and includes a back fence that is square (i.e., perpendicular, orthogonal) to the direction of the saw blade. The prevalent method to ensure the squareness of a crosscut sled is the "five-cut method." This method is renowned for its efficacy in calibrating the squareness of a crosscut sled or any woodworking jig necessitating stringent right-angle cuts. However, implementing the five-cut method is a tedious and time-consuming process.

The traditional five-cut method involves an initial setup where the user aligns the fence of the crosscut sled with the aim of achieving an orthogonal relationship to the saw blade. This alignment typically relies on essential tools like a carpenter's square or visual estimation methods. The core process involves executing four sequential cuts, rotating the workpiece after each cut so that every side undergoes a trimming process. The culmination of this method is a final, fifth cut that removes a slender strip from the last side, with the disparity in the strip's width from one end to the other serving as an indicator of the sled's angular deviation. Subsequently, the user undertakes complex trigonometric calculations to determine the requisite fence adjustment based on the measured disparity in the strip's length. The process may need to be repeated several times before an acceptable disparity is achieved. Despite various attempts at improving the five-cut method, there remains an unmet need in the market for a more streamlined, efficient approach to achieving perfectly orthogonal fences in woodworking jigs.

The efforts to innovate and simplify the five-cut method have been multifaceted but unsuccessful in addressing its intrinsic complexity and time-intensive nature. Jig designs with incrementally adjustable fences have aimed to mitigate initial alignment errors but still necessitate subsequent fine-tuning and recalibration. Digital measurement tools, offering superior precision over traditional methods, have not obviated the necessity for manual computation and adjustment of the sled. Specialized squaring tools, while beneficial in facilitating initial settings, often fail to deliver the desired level of accuracy without multiple iterations. Moreover, the proliferation of educational resources, while beneficial for skill development, primarily focuses on technique refinement rather than offering a groundbreaking solution to the fundamental challenge of alignment.

Therefore, there is a need in the market for an apparatus or methodology that streamlines the process of establishing the position for a fence or other surface of a woodworking jig so that it is square to the blade of a table saw. Addressing this need, embodiments of the present invention provide a novel approach that leverages a direct physical reference from the saw's kerf, thereby eliminating the need for elaborate trigonometric calculations and iterative adjustments. This approach not only simplifies the process but also significantly enhances accuracy, efficiency, and user experience in woodworking practices, marking a substantial advancement in the field of precision woodworking.

SUMMARY OF THE INVENTION

Embodiments of the present invention provide methods and apparatus for squaring a fence or other surface in a woodworking jig relative to the saw blade of the table saw used with the jig by providing an adjustable tool that may be engaged with a kerf created by the blade of the table saw. Tools of embodiments of the present invention include their own fence that is precisely square (i.e., perpendicular, orthogonal) to a flat side of the tool. The flat side of the tool includes a plurality of tabs that are designed to fit into a kerf created by the table saw blade. Adjusting at least one of the tabs causes the tool to be firmly engaged with the kerf, and also causes the flat side to be perfectly aligned with the kerf. Since the plane of a kerf made using the miter slots of a table saw is parallel to the plane of the blade of the table saw that cut the kerf, when the tool's tabs are engaged in the kerf, the tool's own fence is perpendicular to the plane of both the kerf and the table saw blade. This makes it possible to use the tool's own fence to position a new fence or other surface of a woodworking jig to be square (perpendicular) to the plane or cutting direction of the table saw blade.

For example and without limitation, embodiments of the tool of the present invention may be used in making a crosscut sled, in which case the tool may be used to determine the precise position for attaching the back fence to the sled so that the back fence has an orientation that is square to the cutting direction of the table saw blade. Embodiments of the tool of the present invention may be used in making other jigs that require a surface to be square to the direction of the saw blade such as jigs on a router table, jigs on a miter saw, etc. Embodiments of the methods of the present invention provide steps for using such a tool to establish the position for the back fence of a crosscut sled, or other jig surface, without having to use the five-cut method.

Embodiments of the tool of the present invention may include a body having a flat side with tabs thereon that fit into a kerf created by the table saw blade. In some embodiments, two fixed tabs are provided along a straight, flat side of the tool, with each tab being aligned with the other tab. These two tabs may be provided at or near opposite ends of the flat side of the tools of the present invention to make a large jug such as a crosscut sled, or they may be placed closer together for use in making smaller jigs. At least one adjustable tab is provided between the two fixed tabs. This additional tab(s) may be provided near the middle of the flat side of the tool. The tool body is attached to its own fence in a manner that the tool's fence is perfectly perpendicular to the flat side of the tool.

It is to be appreciated that in other embodiments of the invention, the position of the tool's own fence may not only be set to perpendicular to the side of the tool (and the saw blade), but may also be set at other angles relative to the side of the tool (saw blade and kerf) in the event that different positioning is desired.

In these embodiments, the tool's fence may be attached to the tool at any appropriate angle relative to the side of the tool including without limitation 90°, 45°, 30°, 22.5°, 15°, 11.25° and/or other desired setting between 0° and 90°. It is to be appreciated that in embodiments of the invention the angle of the tool's fence relative to the side of the tool may be any angle between 0° and 180°, including any standard setting between these angles.

In use, the saw blade of a table saw is used to cut an elongated kerf into a piece of wood. This kerf should be within the edges of the wood piece and not extend to either end in order to preserve the strength of the wood piece itself. The widths of the tabs on embodiments of the tool should be smaller than the width of the kerf cut by the table saw blade. All three tabs may then be inserted into the kerf. The two end tabs may be held against a near edge of the kerf, and the adjustable middle tab may then be extended out until it is firmly pressed against a far edge of the kerf. This causes the tool to be securely engaged with the kerf of the wood piece, with the fixed tabs precisely aligned with the kerf. This causes the flat side to be precisely parallel to the kerf, and the tool's fence to be precisely perpendicular to the kerf. Since the kerf was created by the blade of the table saw, it has a plane that is parallel to the plane or cutting direction of the blade of the table saw, and the tool's fence is now perpendicular to this plane. The tool's fence can therefore be used to establish the position of a surface on a woodworking jig that is to be square (perpendicular, orthogonal) to the plane or direction of the table saw blade, such as the back fence of a crosscut sled.

In some aspects, embodiments of the invention include an apparatus for use in creating a woodworking jig having a member with a surface that has a defined angle relative to the plane of a table saw blade comprising: a tool body having a proximal end and a distal end, and an elongated straight flat side surface between the ends defining a first plane; a flat member attached to the distal end of the tool body defining a second plane that has an orientation that is set at a defined angle relative to the first plane of the side surface; a slot provided at a central location on the side surface of the tool body, the slot being adapted to receive a movable member having a first tab at an end thereof, the tab extending along the side surface of the tool body; a second tab attached along the side surface between the slot and the proximal end of the tool body, and a third tab attached along the side surface between the slot and the distal end of the tool body, wherein the second and third tabs are aligned with each other along the first plane of the side surface.

In related aspects the defined angle of the second plane may be perpendicular to the first plane, or it may be selected from the group of 90°, 45°, 30°, 22.5°, 15°, and 11.25°. In other aspects the defined angle of the second plane is between 0° and 90° relative to the first plane, or it may be between 0° and 180° relative to the first plane.

In other aspects, embodiments of the invention may comprise a securing bracket attached to the tool body over the slot, the bracket having a lip thereon adapted to hold the movable member in the slot. In other aspects, embodiments of the invention may comprise a spring provided between the lip of the bracket and the movable member for urging the movable member inward into the slot toward the tool body. In other aspects, embodiments of the bracket of the invention may include a bore therethrough, and may further comprise a shaft adapted for movable insertion into the bore of the bracket, and a knob attached at one end of the shaft. In some embodiments, the shaft may be movable between an extended position wherein an end of the shaft engages an end of the movable member and pushes the movable member out of the slot, and a retracted position wherein the end of the shaft is not in contact with the movable member such that the spring pushes the movable member inward into the slot. In some embodiments, helical threads may be provided along the shaft and complementary helical threads may be provided inside the bore. In some embodiments, the woodworking jig to be created is a crosscut sled, and the member with the surface that is perpendicular to the plane of the table saw blade is a back fence of the crosscut sled.

Some aspects of the invention include methods method for establishing a position that is perpendicular to the plane of a blade of a table saw comprising the steps of: aligning a pair of tabs along a first plane of a straight flat side surface of a tool body, the side surface having a centrally located slot therein; attaching a flat member to an end of the tool body such that the flat member defines a second plane having an orientation that is perpendicular to the first plane of the side surface; retracting a shaft from a bore in a bracket attached to the tool body over the slot in the side surface in which a movable member having a tab at an end thereof is deployed, the movable member being urged toward the tool body by a biasing member as a result of the retracting of the shaft; cutting a kerf into a portion of a wood piece using the table saw blade, the kerf being aligned with miter guides of the table saw; inserting the pair of tabs into the kerf against a near side of the kerf; inserting the shaft into the bore in order to push the movable member out of the slot such that the tab at the end of the movable member firmly engages a far side of the kerf, temporarily securing the tool to the kerf such that the flat member at the end of the tool body is perpendicular to the kerf. In other aspects, the methods may comprise the additional steps of clamping a second wood piece to the flat member at the end of the tool body, and attaching the second wood piece to the first wood piece.

Other aspects of the invention may include a tool for use in creating a woodworking jig having a member with a surface that is perpendicular to the plane of a table saw blade comprising: a tool body having a proximal end and a distal end, and an elongated straight flat side surface between the ends defining a first plane; a flat member attached to the distal end of the tool body defining a second plane that has an orientation that is perpendicular to the first plane of the side surface; a slot provided at a central location on the side surface of the tool body, the slot being adapted to receive a movable member having a first tab at an end thereof that extends along the side surface of the tool body; a securing bracket attached to the tool body over the slot, the bracket having a lip thereon adapted to hold the movable member in the slot, the bracket having a bore extending therethrough from top to bottom; a spring provided between the lip of the bracket and the movable member for urging the movable member inward into the slot toward the tool body; a shaft adapted for movable insertion into the bore of the bracket, and a knob attached at one end of the shaft; a second tab attached along the side surface of the tool body between the slot and the proximal end of the tool body, and a third tab attached along the side surface of the tool body between the slot and the distal end of the tool body, in which the second and third tabs are aligned with each other along the first plane of the side surface.

Further aspects and embodiments will be apparent to those having skill in the art from the description and disclosure provided herein.

It is therefore an object of the present invention to provide tools for use in making woodworking jigs that establish a position for a fence or other surface of the jig being made to be square to the direction of the blade of the table saw with which the jig being made is to be used.

It is also an object of the present invention to provide tools for use in making a crosscut sleds that positions the back fence of the sled so that the back fence square (perpendicular) to the blade of the table saw with which the crosscut sled is to be used.

It is also an object of the present invention to provide methods of making woodworking jigs having a fence or other surface that is square to the direction of the blade of the table saw with which the jig being made is to be used without using the five-cut method.

It is also an object of the present invention to provide methods of making a crosscut sled having a back fence that is square to the direction of the blade of the table saw with which the crosscut sled is to be used without using the five-cut method.

It is also an object of the present invention to provide methods of making woodworking jigs that are square to the cutting tool on a router table and miter saw.

It is also an object of the present invention to provide methods of making woodworking jigs having a defined angle relative to the cutting tool on a router table that ranges from between 0° and 180°, including without limitation, standard settings such as 90°, 45°, 30°, 22.5°, 15°, 11.25°.

Other objects of the present invention will be apparent from the detailed description and the claims herein.

The above-described objects, advantages, and features of embodiments of the invention, together with the organization and manner of operation thereof, will become apparent from the following detailed description when taken in conjunction with the accompanying drawings, wherein like elements have like numerals throughout the several drawings described herein. Further benefits and other advantages of the present invention will become readily apparent from the detailed description of the preferred embodiments.

DETAILED DESCRIPTION OF THE INVENTION

Reference will now be made in detail to certain embodiments of the invention, examples of which are illustrated in the accompanying drawings. While the invention will be described in reference to these embodiments, it will be understood that they are not intended to limit the invention. To the contrary, the invention is intended to cover alternatives, modifications, and equivalents that are included within the spirit and scope of the invention. In the following disclosure, specific details are given to provide a thorough understanding of the invention. However, it will be apparent to one skilled in the art that the present invention may be practiced without all of the specific details provided. For example and without limitation, although embodiments of the invention are described herein with reference to making a crosscut sled, embodiments of the invention may also be used to make other woodworking jigs such as an upright tenoning jig, a jig for cutting half lap joints, and/or a jig for cutting box joints which require a fence or other surface to be square to the direction of the blade of the table saw with which the jigs will be used.

Figure 1:
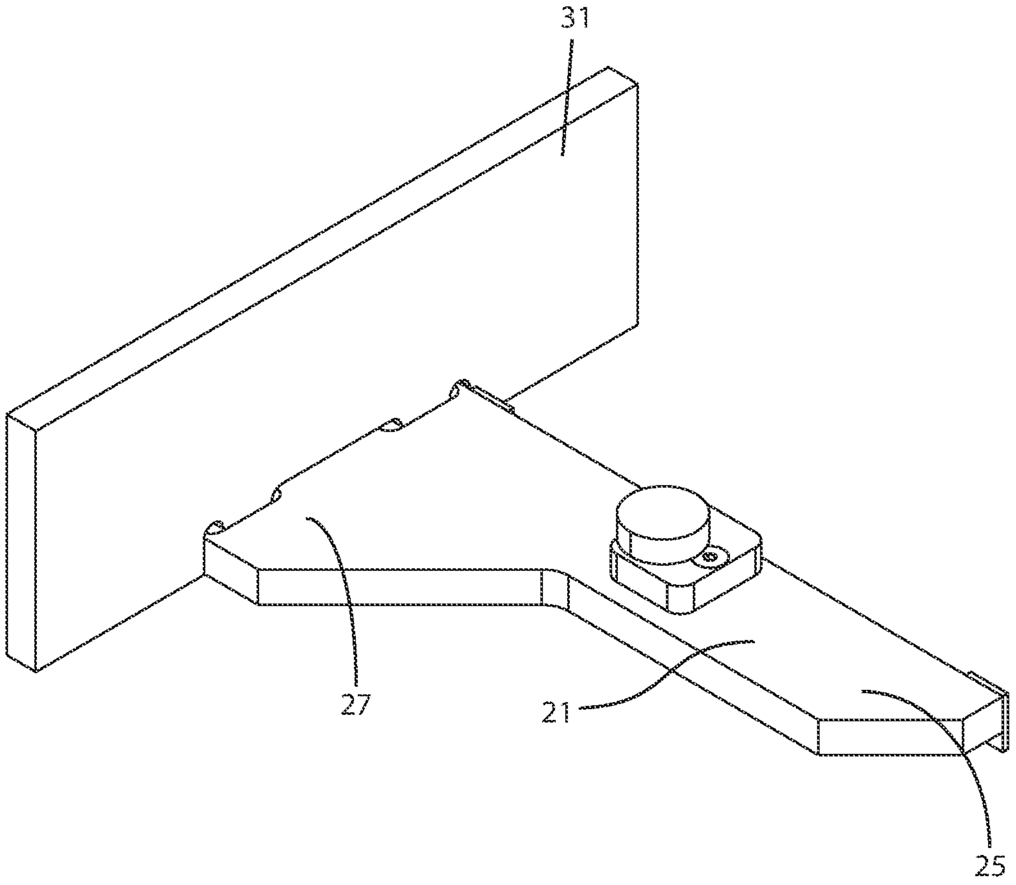
FIG. 1 is an upper perspective view of a top of an embodiment of a tool of the present invention.
Figure 2:
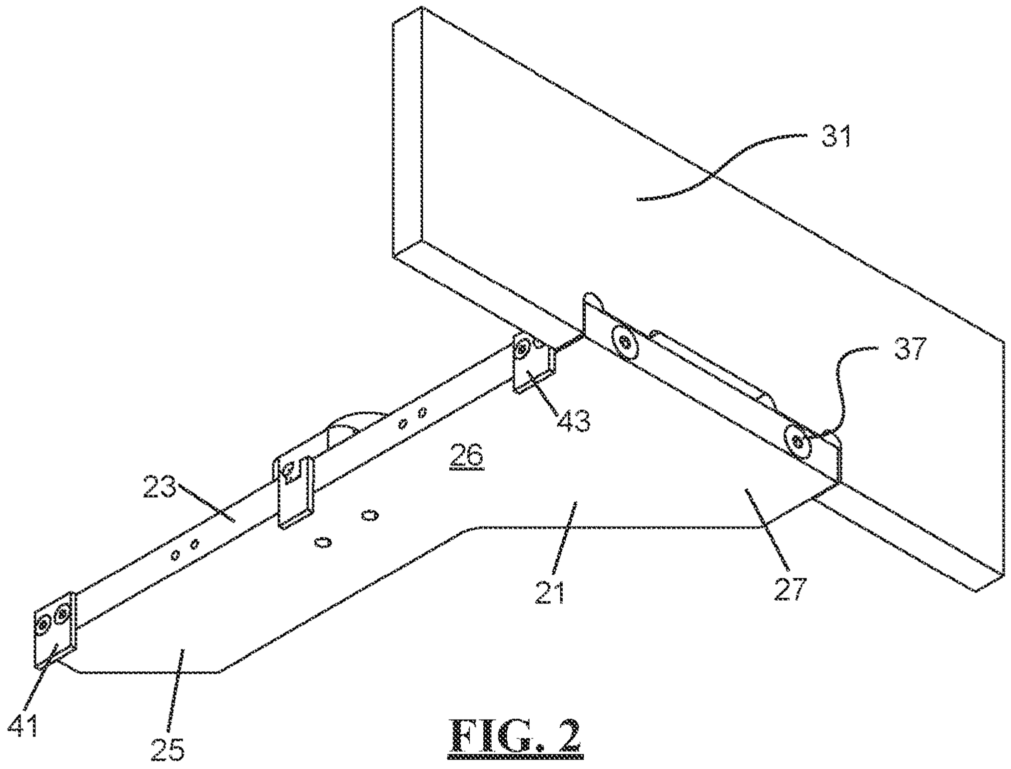
FIG. 2 is a lower perspective view of a bottom of an embodiment of a tool of the present invention.
Figure 3:
FIG. 3 is a side view of a partially-built crosscut sled having miter slats on a bottom surface thereof.
Figure 4:
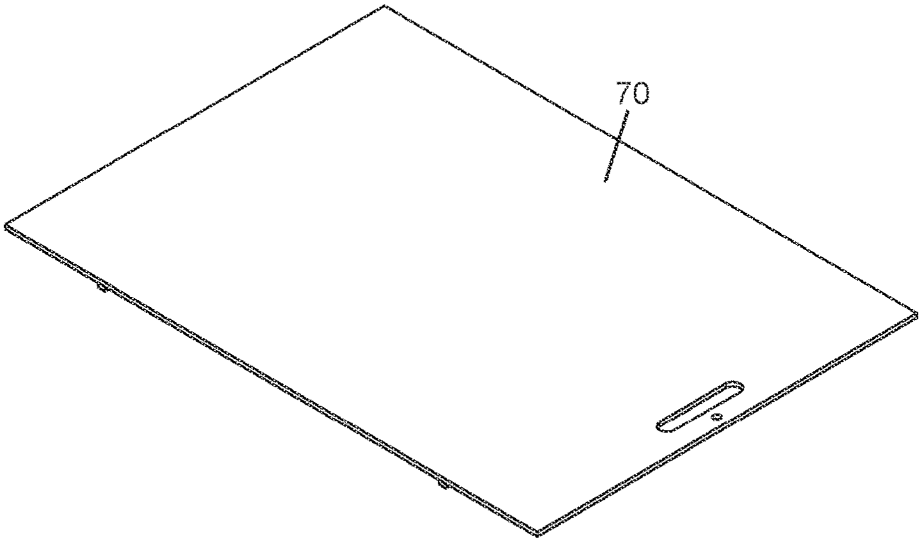
FIG. 4 is a perspective view of the partially-built crosscut sled of FIG. 3.
Figure 5:
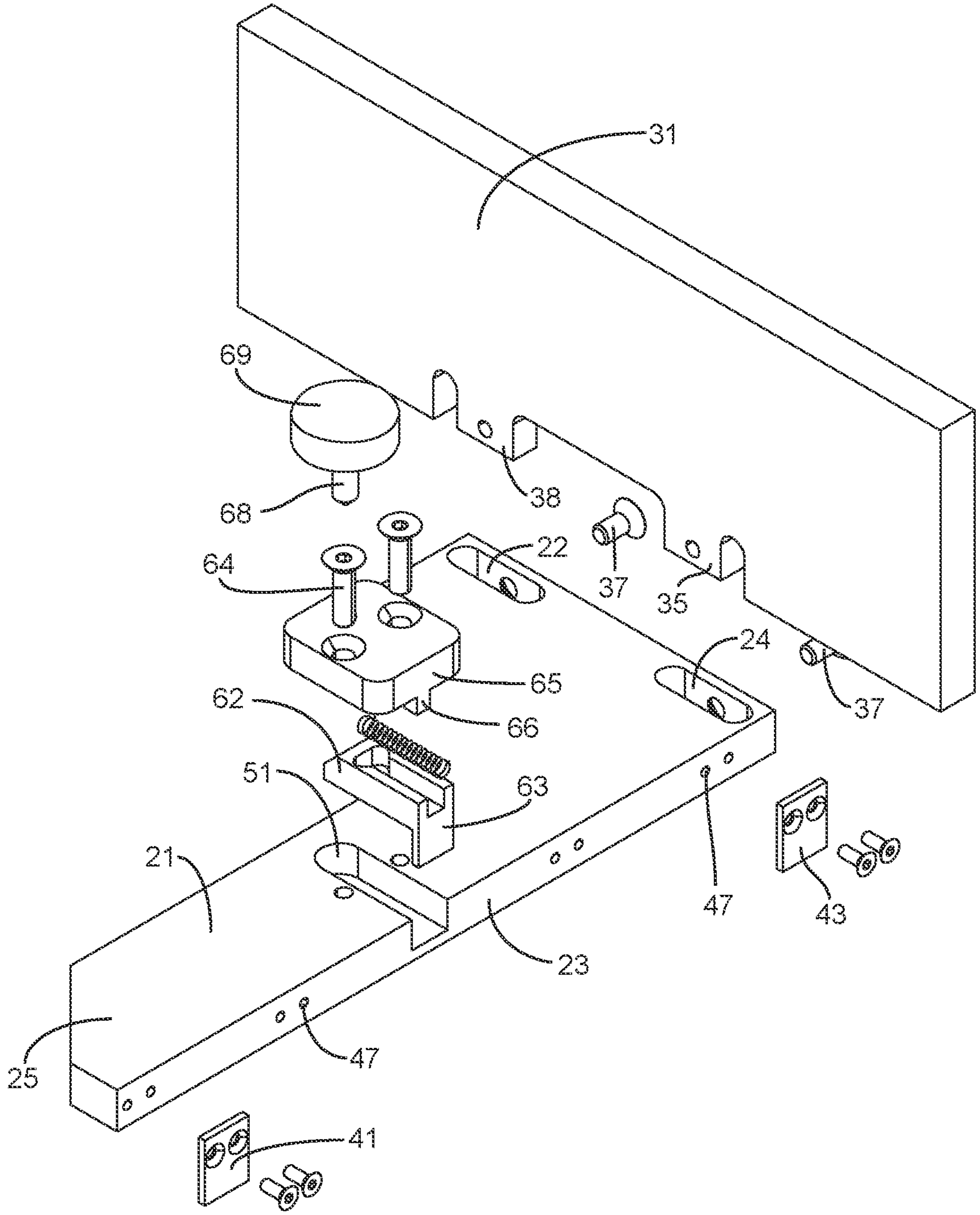
FIG. 5 is an exploded view of an embodiment of a tool of the present invention.

Referring first to FIGS. 1, 2 and 5, it is seen that this illustrated embodiment of the present invention comprises a tool body 21 having a flat straight surface 23 along one side defining a first plane, a proximal end 25 and a distal end 27. A fence 31 is mounted to the distal end 27 of the tool body 21 in a manner that a second plane defined by the fence is precisely perpendicular to the first plane of side surface 23. Fence 31 may be attached to body 21 in any suitable manner. In the illustrated embodiment, extensions 33, 35 on fence 31 may fit into slots 22, 24 in body 21, and fasteners 37 may be used to hold the extensions in place in the slots, as shown in FIGS. 2 and 5.

In the illustrated embodiment, a slot 51 for receiving a centrally located adjustable tab assembly 61 is provided at a central location on side surface 23. A pair of tabs 41, 43 are provided on opposite sides of slot 51. In the illustrated embodiment of FIGS. 2 and 5, a first tab 41 is provided on side surface 23 near the proximal end 25 of body 21; and a second tab 43 is provided on side surface 23 near the distal end 27 of body 21. Tabs 41 and 43 may be attached at any suitable locations along side surface 23, so long as the tabs 41, 43 are aligned with each other, with one of the tabs 41 between tab assembly 61 and the proximal end 25 of side surface 23, and the other tab 43 between tab assembly 61 and the distal end 27 of side surface 23. In the illustrated embodiment, it is seen that tabs 41 and 43 are attached to side surface 23 using fasteners 45 that fit into openings 47. It is to be appreciated that in different embodiments, tabs 41, 43 may be attached to side surface 23 in other suitable ways that allow for these tabs to be aligned along surface 23.

Tabs 41 and 43 may be attached at alternative locations along side surface 23, as reflected by the different locations of openings 47 thereon. The positions of tabs 41 and 43 will depend on the length of the kerf into which they will be inserted. For example and without limitation, when tabs 41 and 43 are to be inserted into a longer kerf, the positions shown in FIGS. 2 and 5 may be used; however, if tabs 41 and 43 are to be inserted into a shorter kerf (e.g., when a tool of the present invention is used to make a smaller jig), one or both of tabs 41 and 43 may be moved closer to central slot 51 and tab assembly 61.

Tabs 41 and 43 are attached to body 21 so that they are precisely aligned with each other along the plane defined by the flat, straight side surface 23, which is perpendicular to the plane of the tool's fence 31. It is seen that each tab 41 and 43 extends slightly below the bottom surface 26 of body 21 in order to fit into a kerf 71 cut by a saw blade, as described below.

Referring to FIGS. 5, 8, 9 and 13, it is seen that the illustrated tab assembly 61 includes a movable member 62 having a tab 63 at an end thereof. Movable member 62 fits into slot 51 such that tab 63 extends down along side surface 23 of body 21. A securing bracket 65 having a lip 66 is provided for holding movable member 62 in slot 51. Bracket may be attached to body 21 using any suitable fasteners such as screws 64. A spring 67 may be provided between lip 66 and movable member 62 for urging movable member 62 inward toward main body 21, as shown in FIG. 8C. A knob 69 is provided having a shaft 68 that may be extended into bracket 65. In some embodiments, shaft 68 may include helical threads, and the bore 60 in bracket 65 may have complementary helical threads, making it possible to turn knob 69 in one direction to insert shaft 68 into bore 60, and in an opposite direction do remove shaft 68 from bore 60. When shaft 68 is in a retracted position shown in FIG. 8D, spring 67 causes tab 63 to be flush against side surface 23. Extending shaft 68 into bore 60 as shown in FIG. 8A, which may be accomplished by turning knob 69, causes tab 63 to extend out. As described below, extending this tab 63, in conjunction with tabs 41 and 43 enables the tool to be firmly engaged with a kerf 71 cut into a board.

Figure 6:
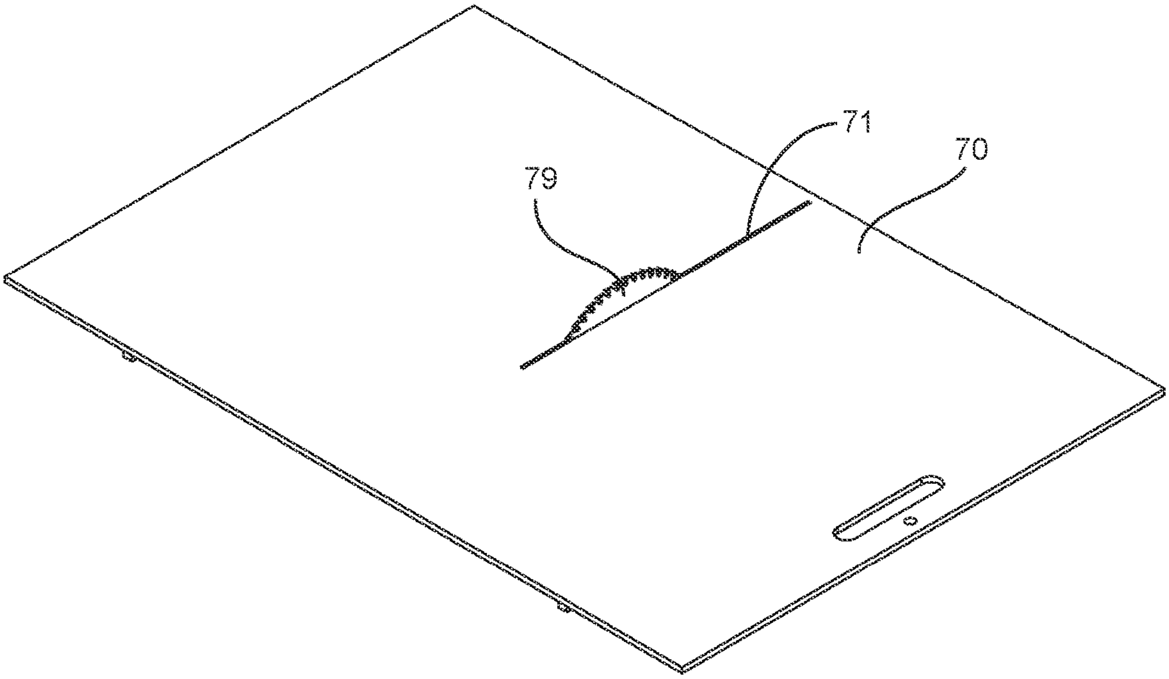
FIG. 6 is a view of a kerf being cut into the partially-built crosscut sled of FIG. 3.
Figure 7:
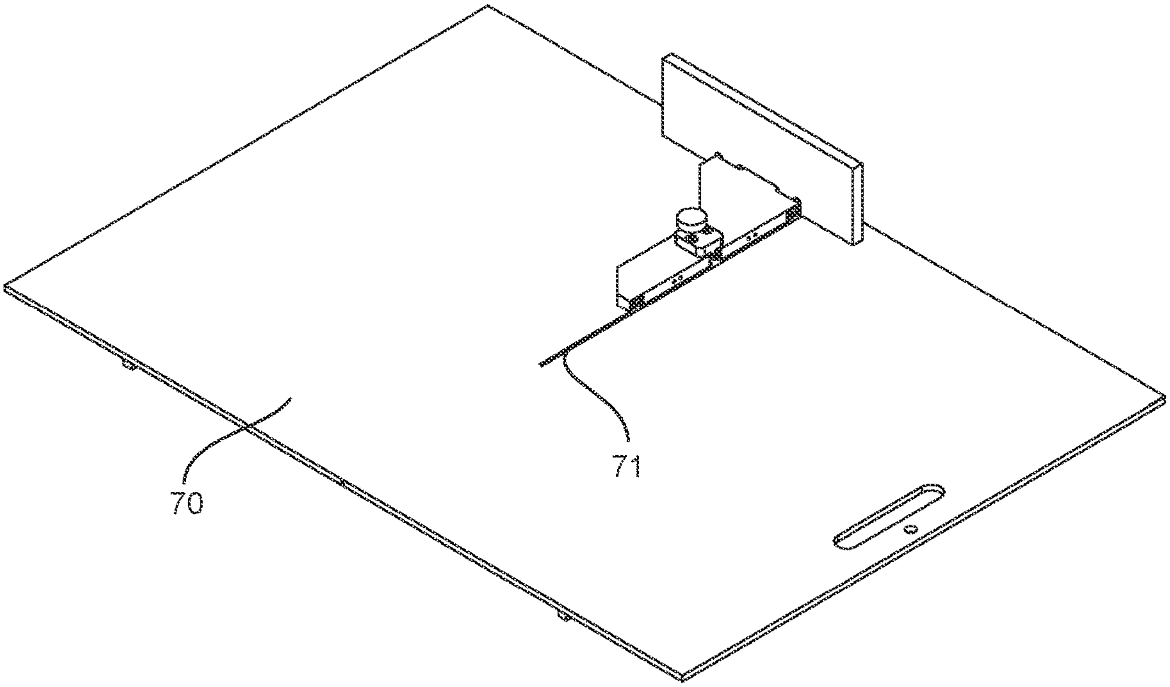
FIG. 7 is a view of an embodiment of the present invention engaged with the kerf of the partially-built crosscut sled of FIG. 6.
Figure 8A:
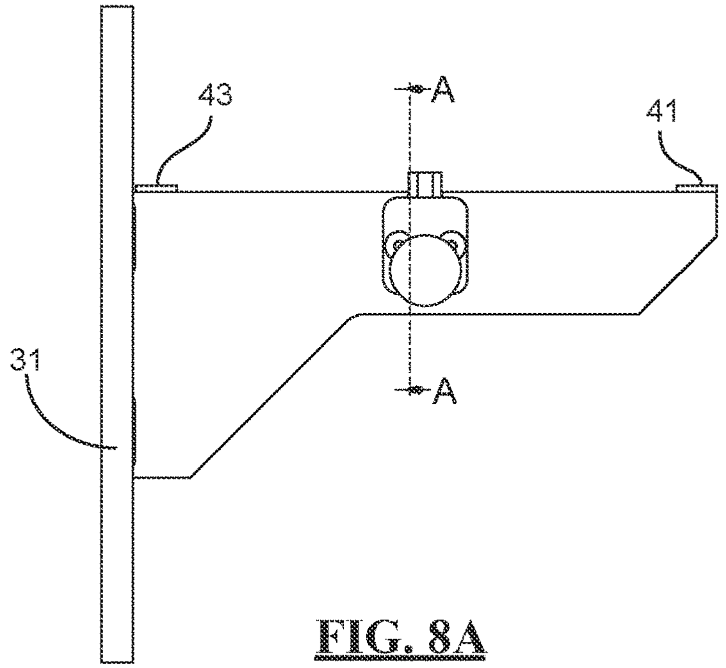
FIG. 8A is a top plan view of an embodiment of a tool of the present invention.
Figure 8B:
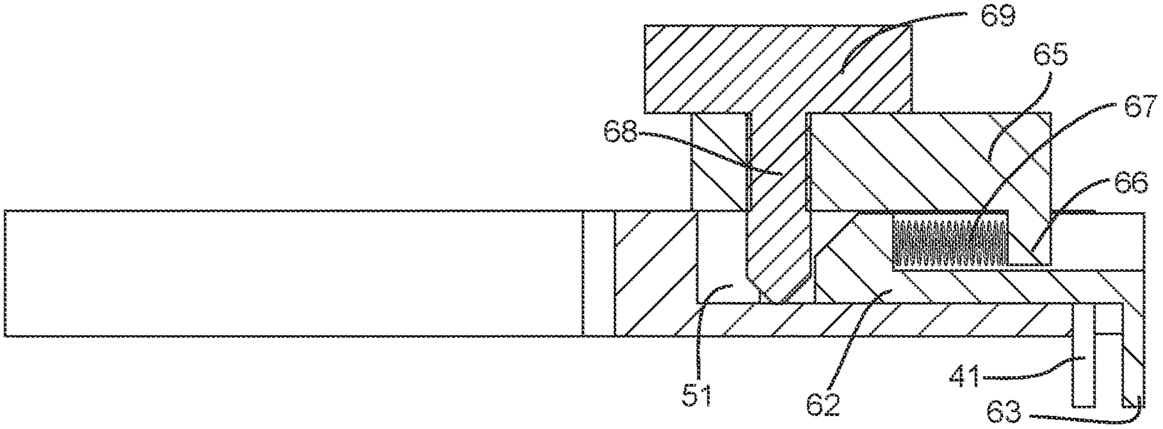
FIG. 8B a cross-sectional end view of a tab adjustment mechanism of an embodiment of the present invention in an extended position.
Figure 8C:
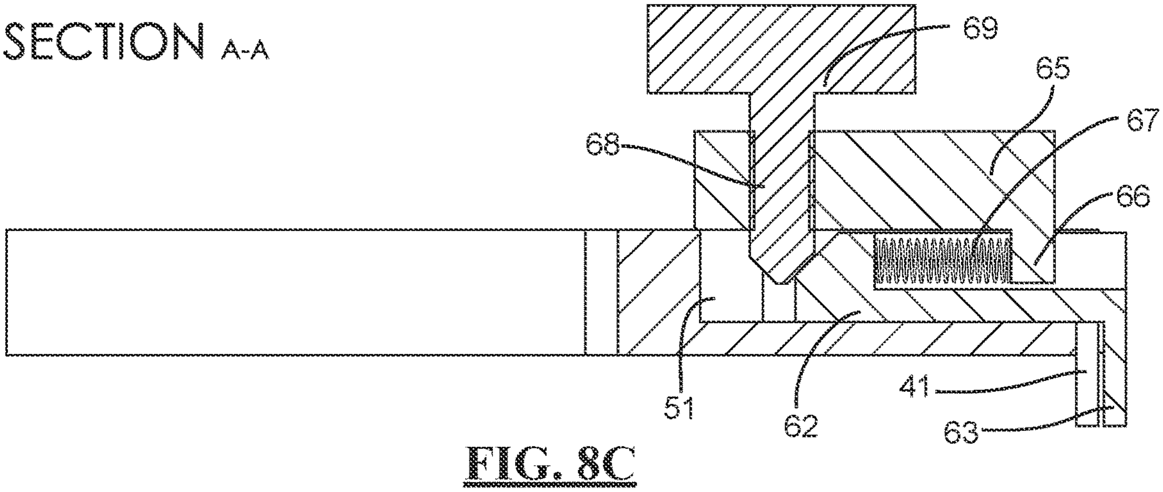
FIG. 8C a cross-sectional end view of a tab adjustment mechanism of an embodiment of the present invention in a partially retracted position.
Figure 8D:
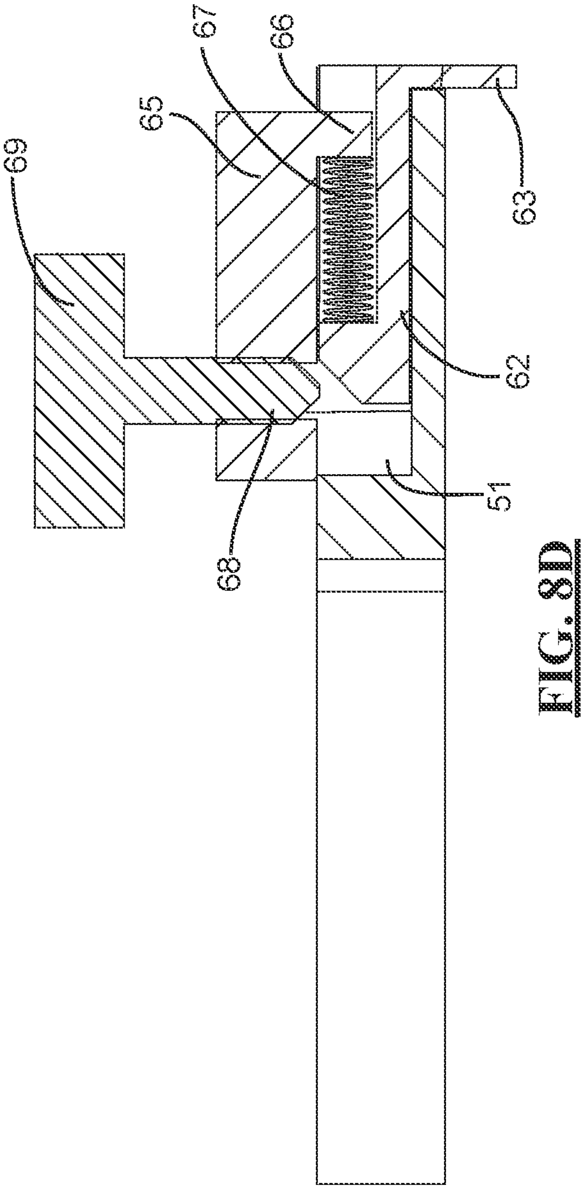
FIG. 8D a cross-sectional end view of a tab adjustment mechanism of an embodiment of the present invention in a fully retracted position.
Figure 9A:
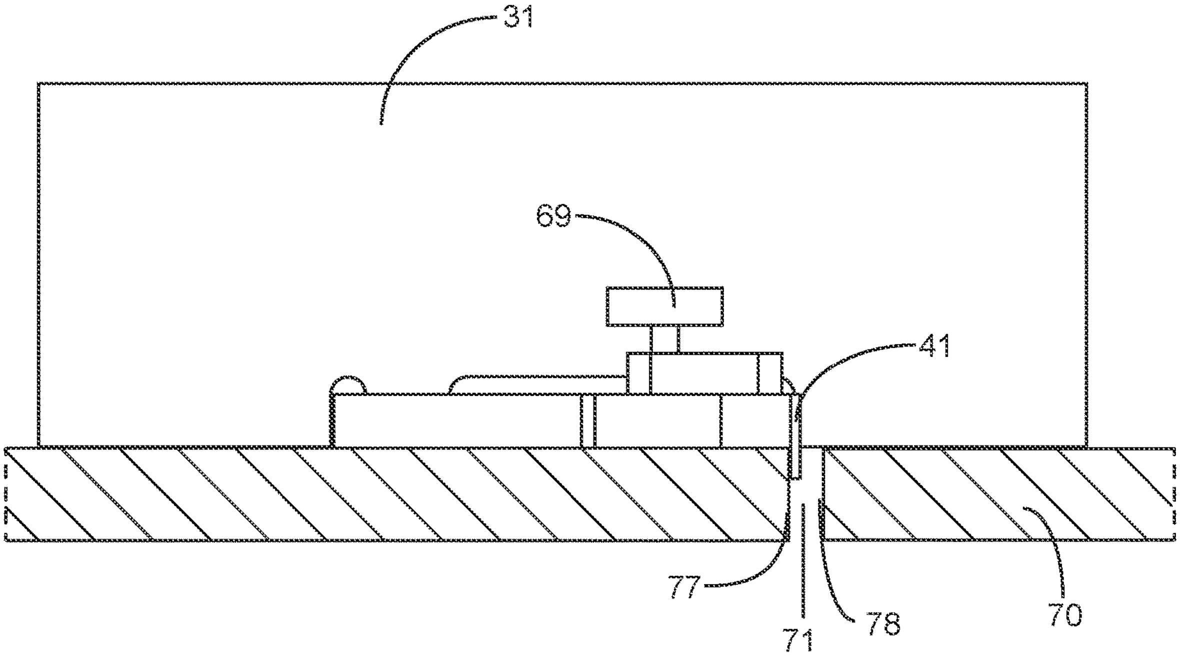
FIG. 9A is an environmental cross-sectional end view of a tool of an embodiment of the present invention resting on the crosscut sled shown in FIG. 7 with an adjustable tab of the tool in a retracted position.
Figure 9B:
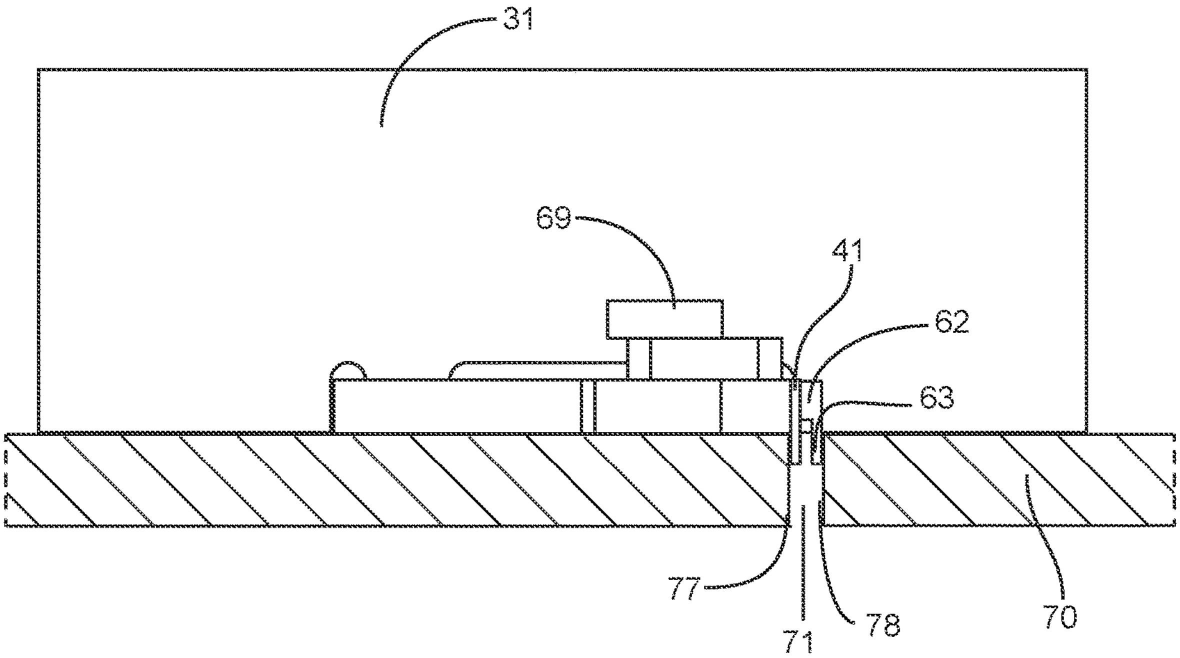
FIG. 9B is an environmental cross-sectional end view of a tool of an embodiment of the present invention resting on the crosscut sled shown in FIG. 7 with an adjustable tab of the tool in an extended position.

Embodiments of the invention may be used by first making sure that fence 31 is attached to body 21 in a way that is precisely perpendicular to side surface 23, and that tabs 41 and 43 are aligned with each other along side 23 of the tool body. The positions of tabs 41 and 43 should then be established based on the length of the kerf 71 into which they will be inserted. If kerf 71 is short, then tabs 41 and 43 should be closer together, while still on opposite sides of slot 51 and assembly 61. If kerf 71 is longer, then tabs 41 and 43 may be farther from slot 51 and assembly 61. Knob 69 should be initially turned or removed so that movable member 62 and tab 63 are fully retracted through the urging of biasing member 67. A kerf 71 is then cut into a piece of wood 70 using the miter guides (not shown) of the table saw so that the kerf is parallel to the blade of the saw. This may be accomplished, for example, by attaching a pair of runners 72 to the bottom of the wood piece so that they fit into the parallel miter guides, and then cutting a kerf 71 into the wood piece using the saw blade 79 as the runners slide through the miter guides. An example of such a kerf 71 is shown in FIG. 6 as part of the making of a crosscut sled. Once a kerf 71 has been cut, tabs 41 and 43 of an embodiment of the invention may be inserted into the kerf 71, as shown in FIG. 7. Tabs 41 and 43 engage a near side 77 of kerf 71, as shown in FIG. 9A. Then knob 69 is turned or otherwise moved downward to cause shaft 68 to press against movable member 62. This downward movement of shaft 68 causes tab 63 at the end of movable member 62 to be extended out into kerf 71. This movement continues until tab 63 is pressed firmly against a far side 78 of kerf 71, as shown in FIG. 9B. This firm pressure causes the tool of the present invention to be firmly engaged with the kerf 71.

Figure 10:
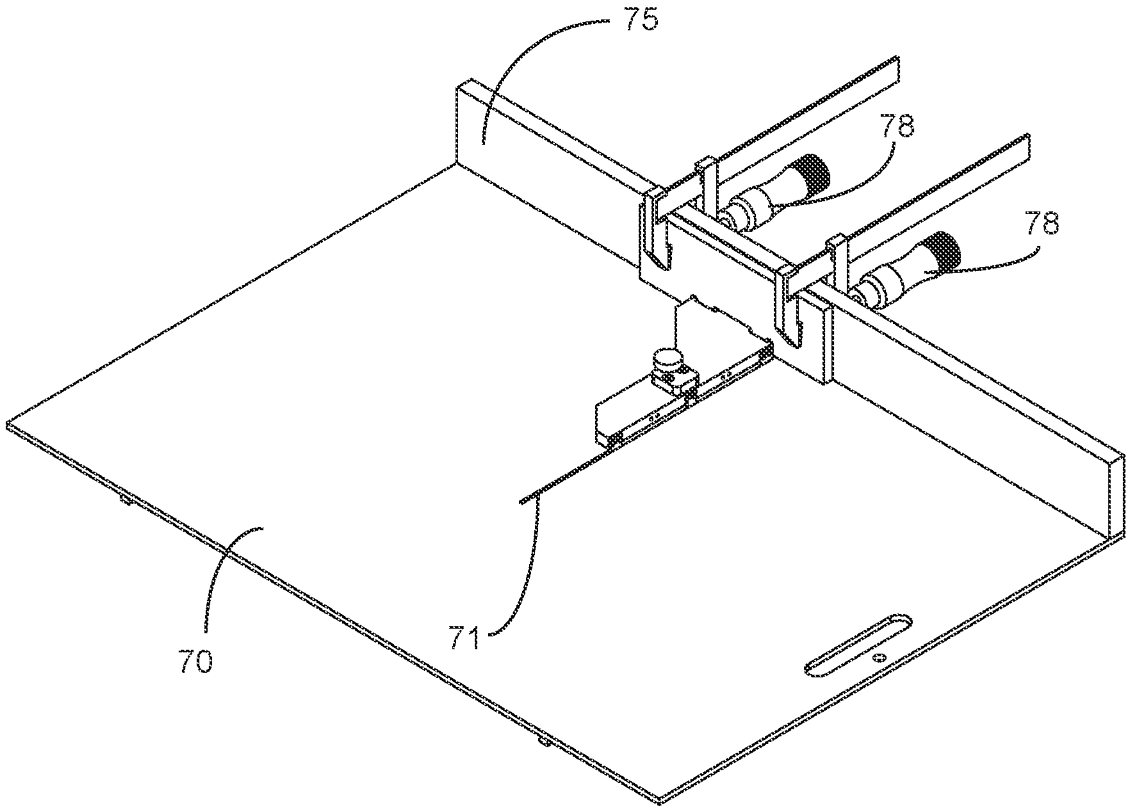
FIG. 10 is a view of an embodiment of the present invention engaged with both the kerf of the partially-built crosscut sled as shown in FIG. 7 and with a back fence for the crosscut sled.
Figure 11:
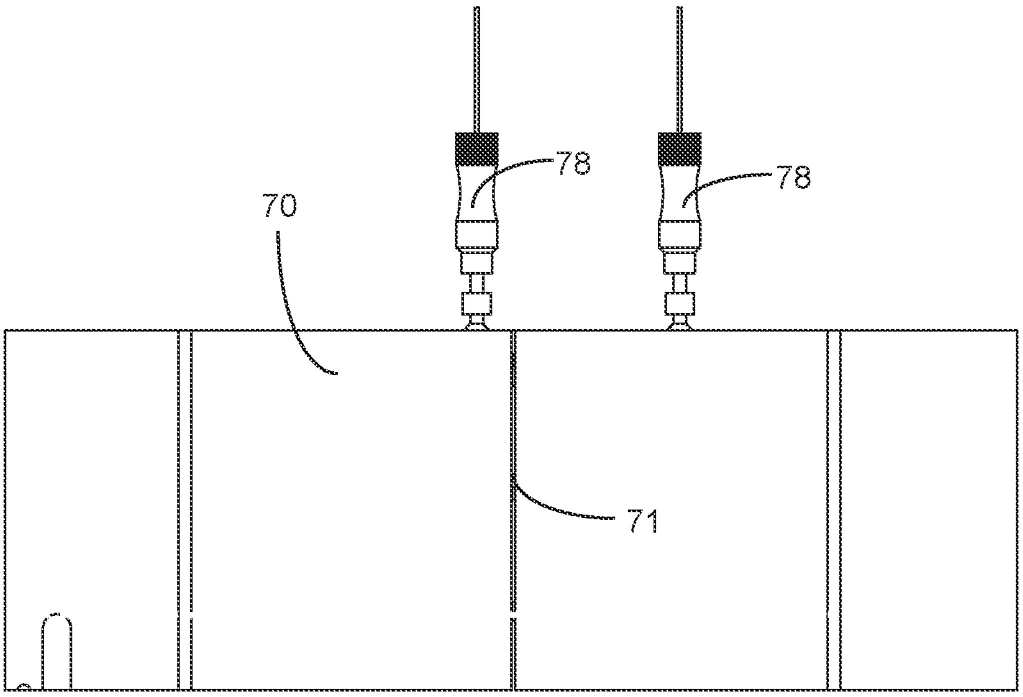
FIG. 11 is a bottom plan view of the of the crosscut sled of FIG. 10 engaged with a tool of an embodiment of the present invention.
Figure 12:
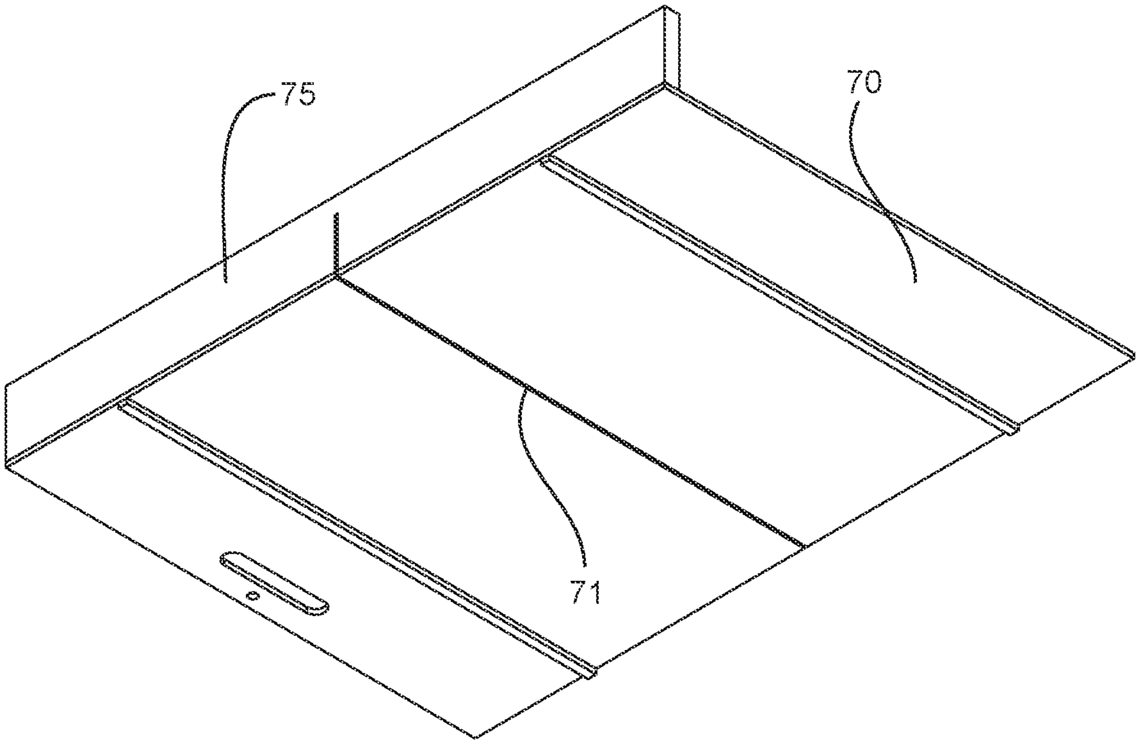
FIG. 12 is a bottom perspective view of the crosscut sled of FIG. 10 after removal of the tool of an embodiment of the present invention.
Figure 13A:
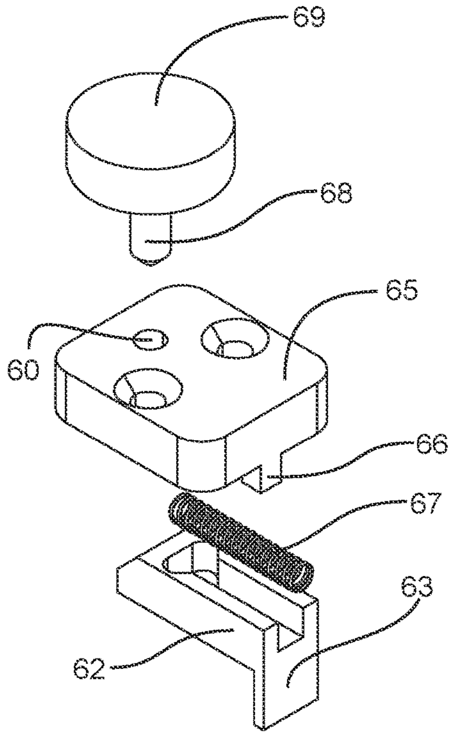
FIG. 13A is an exploded view of a tab adjustment mechanism of an embodiment of the present invention.
Figure 13B:
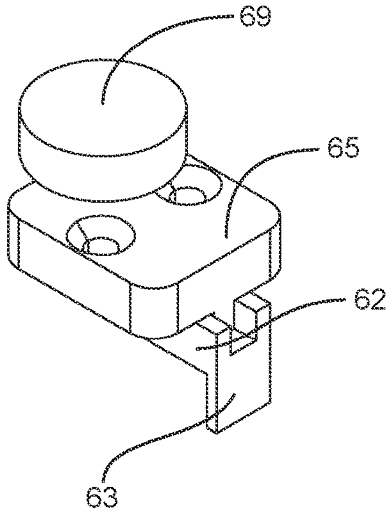
FIG. 13B is an perspective view of a tab adjustment mechanism of an embodiment of the present invention.
Figure 13C:
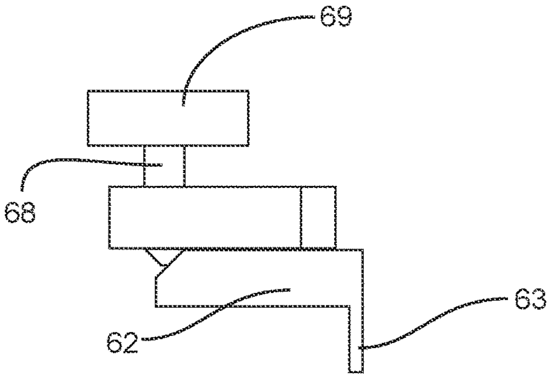
FIG. 13C is a cross-sectional side view of a tab adjustment mechanism of an embodiment of the present invention in a retracted position.
Figure 13D:
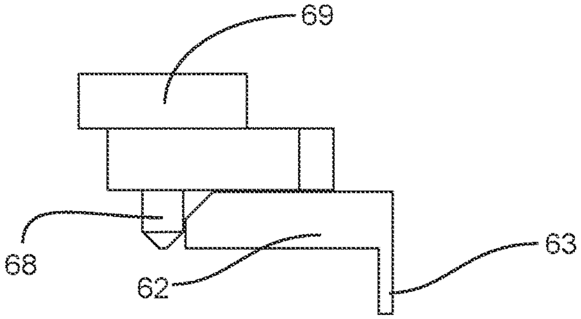
FIG. 13D is a cross-sectional side view of a tab adjustment mechanism of an embodiment of the present invention in an extended position.

Once an embodiment of the tool of the present invention has been engaged with a kerf 71 of a piece of wood, the plane of the tool's side 23 will be parallel to the plane of the kerf 71, such that the plane of the tool's fence 31 will be perpendicular to both the kerf 71 and the saw blade 79 that cut it, as shown in FIG. 7. This is because the plane of kerf 71 is parallel to the runners 72 which are parallel to the miter guides of the saw blade 79 that cut the kerf. In the illustrated example of a crosscut sled, the position for the perpendicular fence 75 of the sled is established by the position of the tool's fence 31. In the illustrated embodiment, sled fence 75 may then be glued to the sled body 70 and held in position using clamps or other means 78 as shown in FIGS. 10 and 11. After drying, the clamps 78 may be removed and the kerf 71 of the sled may be completed, as shown in FIG. 12.

It is to be appreciated that embodiments of the invention may be used in conjunction with any kerf cut into a wood piece by a table saw blade in order to establish the square position of another surface with respect to the kerf and the saw blade.

It is to be understood that variations, modifications, and permutations of embodiments of the present invention, and uses thereof, may be made without departing from the scope of the invention. It is also to be understood that the present invention is not limited by the specific embodiments, descriptions, or illustrations or combinations of either components or steps disclosed herein, and that the present invention encompasses many other combinations of the various features disclosed herein. The embodiments were chosen and described in order to best explain the principles of the invention and its practical application, to thereby enable others skilled in the art to best utilize the invention and various embodiments with various modifications as are suited to the particular use contemplated. Although reference has been made to the accompanying figures, it is to be appreciated that these figures are exemplary and are not meant to limit the scope of the invention. It is intended that the scope of the invention be defined by the claims appended hereto and their equivalents.

The invention claimed is:

1. An apparatus for use in creating a woodworking jig having a member with a surface that has a defined angle relative to the plane of a table saw blade comprising:
   a. a tool body having a proximal end and a distal end, and an elongated straight flat side surface between said ends defining a first plane;
   b. a flat member adjustably attached to the distal end of the tool body defining a second plane that has an orientation that is set at a defined angle relative to the first plane of the side surface;
   c. a securing bracket provided on an upper surface of said tool body at a central location of the side surface of the tool body, the securing bracket being adapted to receive a movable member having a first tab at an end thereof, the tab extending along the side surface of the tool body;

d. a second tab attached along the side surface between the securing bracket and the proximal end of the tool body, and e. a third tab attached along the side surface between the securing bracket and the distal end of the tool body, wherein the second and third tabs are aligned with each other along the first plane of the side surface.

2. The apparatus of claim 1 wherein the defined angle of the second plane is perpendicular to the first plane.

3. The apparatus of claim 1 wherein the defined angle of the second plane is selected from the group of 90°, 45°, 30°, 22.5°, 15°, and 11.25° relative to the first plane.

4. The apparatus of claim 1 wherein the defined angle of the second plane is between 0° and 90° relative to the first plane.

5. The apparatus of claim 1 wherein the defined angle of the second plane is between 0° and 180° relative to the first plane.

6. The apparatus of claim 2 further comprising a spring provided between a lip of the bracket and the movable member for urging the movable member inward into a slot on the tool body.

7. The apparatus of claim 6 wherein the bracket includes a bore therethrough, the apparatus further comprising a shaft adapted for movable insertion into the bore of the bracket, and a knob attached at one end of the shaft.

8. The apparatus of claim 7 wherein the shaft is movable between an extended position wherein an end of the shaft engages an end of the movable member and pushes the movable member out of the slot, and a retracted position wherein the end of said shaft is not in contact with the movable member such that the spring pushes the movable member inward into the slot.

9. The apparatus of claim 7 wherein helical threads are provided along the shaft and complementary helical threads are provided inside the bore.

10. The apparatus of claim 2 wherein the woodworking jig is a crosscut sled, and the member with the surface that is perpendicular to the plane of the table saw blade is a back fence of the crosscut sled.

11. A method for establishing a position that is perpendicular to the plane of a blade of a table saw comprising the steps of:

a. aligning a pair of tabs along a first plane of a straight flat side surface of a tool body, the side surface having a centrally located slot therein;

b. attaching a flat member to an end of the tool body such that the flat member defines a second plane having an orientation that is perpendicular to the first plane of the side surface;

c. retracting a shaft from a bore in a bracket attached to the tool body over the slot in the side surface in which a movable member having a tab at an end thereof is deployed, the movable member being urged toward the tool body by a biasing member as a result of the retracting of the shaft;

d. cutting a kerf into a portion of a wood piece using the table saw blade, the kerf being aligned with miter guides of the table saw;

e. inserting the pair of tabs into the kerf against a near side of the kerf;

f. inserting the shaft into the bore in order to push the movable member out of the slot such that the tab at the end of the movable member firmly engages a far side of the kerf, temporarily securing the tool to the kerf such that the flat member at the end of the tool body is perpendicular to the kerf.

12. The method of claim 11 comprising the additional steps of clamping a second wood piece to the flat member at the end of the tool body, and attaching the second wood piece to the first wood piece.

13. A tool for use in creating a woodworking jig having a member with a surface that is perpendicular to the plane of a table saw blade comprising:

a. a tool body having a proximal end and a distal end, and an elongated straight flat side surface between said ends defining a first plane;

b. a flat member adjustably attached to the distal end of said tool body defining a second plane that has an orientation that is perpendicular to the first plane of the side surface;

c. a slot provided at a central location on the side surface of the tool body, the slot being adapted to receive a movable member having a first tab at an end thereof that extends along the side surface of the tool body;

d. a securing bracket attached to the tool body over the slot, said bracket having a lip thereon adapted to hold the movable member in the slot, the bracket having a bore extending therethrough from top to bottom;

e. a spring provided between the lip of the bracket and the movable member for urging the movable member inward into the slot toward the tool body;

f. a shaft adapted for movable insertion into the bore of the bracket, and a knob attached at one end of the shaft;

g. a second tab attached along the side surface of the tool body between the slot and the proximal end of the tool body, and h. a third tab attached along the side surface of the tool body between the slot and the distal end of the tool body, wherein the second and third tabs are aligned with each other along the first plane of the side surface.

14. An apparatus for use in squaring a fence of a woodworking jig comprising:

a. a tool body having a proximal end, a distal end, an upper surface, and an elongated straight flat side surface between said ends said side surface defining a first plane;

b. a fence member adjustably attached to the distal end of the tool body defining a second plane that has an orientation that is perpendicular to the first plane of the side surface;

c. a bracket provided on the upper surface of the tool body at a central location of the side surface of the tool body;

d. an extendable member movably provided in the bracket, the extendable member having a first tab at an end thereof, the first tab extending along the side surface of the tool body;

e. a second tab attached along the side surface of the tool body between the bracket and the proximal end of the tool body, f. a third tab attached along the side surface of the tool body between the bracket and the distal end of the tool body, wherein the second and third tabs are aligned with each other along the first plane of the side surface.

15. The apparatus of claim 14 further comprising a slot in said tool body located below said bracket, the slot being adapted to receive said extendable member.

16. The apparatus of claim 15 further comprising a spring provided between a lip of the bracket and the extendable member for urging the extendable member inward toward the tool body.

17. The apparatus of claim 16 wherein the bracket includes a bore therethrough, the apparatus further comprising a shaft adapted for movable insertion into the bore of the bracket, and a knob attached at one end of the shaft.

18. The apparatus of claim 17 wherein the shaft is movable between an extended position wherein an end of the shaft engages an end of the extendable member and pushes the extendable member out of the slot, and a retracted position wherein the end of said shaft is not in contact with the extendable member such that the spring pushes the extendable member inward into the slot.

19. The apparatus of claim 17 wherein helical threads are provided along the shaft and complementary helical threads are provided inside the bore.

* * * * *